H. T. HALLOWELL.
PROCESS OF MAKING SHAFT COUPLING SLEEVES.
APPLICATION FILED JUNE 5, 1909.
1,107,607.
Patented Aug. 18, 1914.
3 SHEETS—SHEET 1.
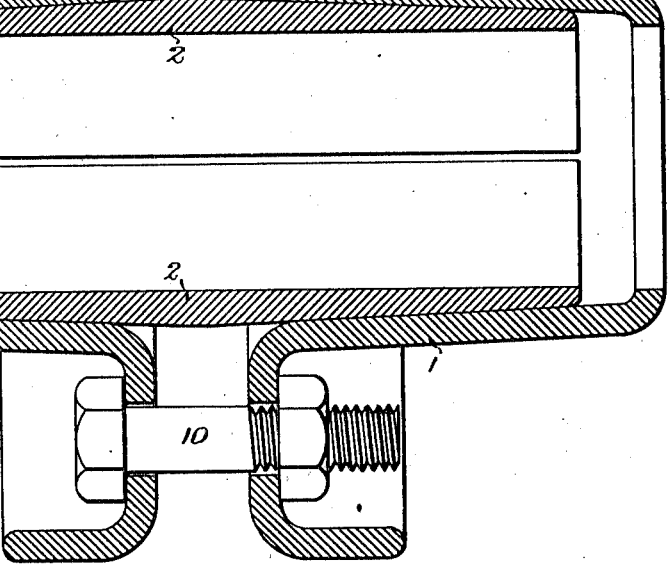
Fig. 1.
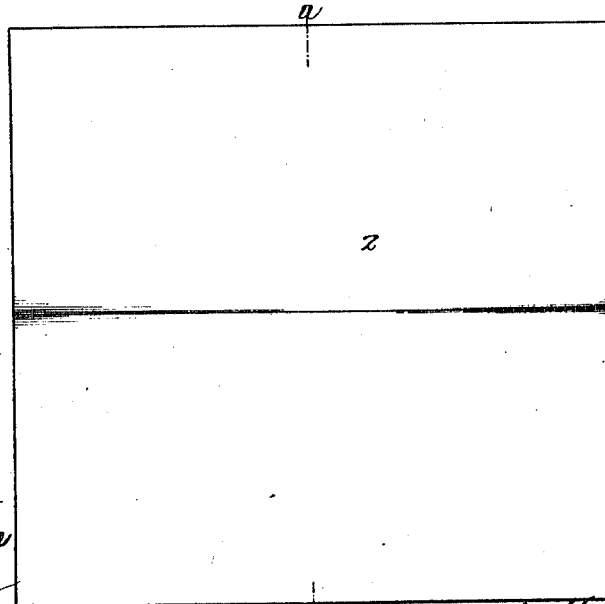
Fig. 5.
Fig. 3.
Witnesses:—
Inventor:—
Howard T. Hallowell.
by his Attorneys

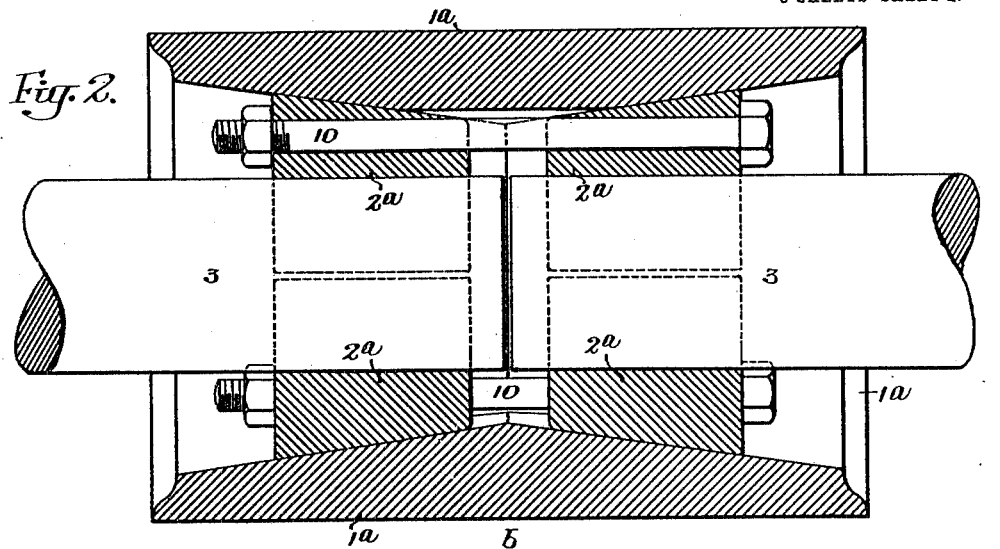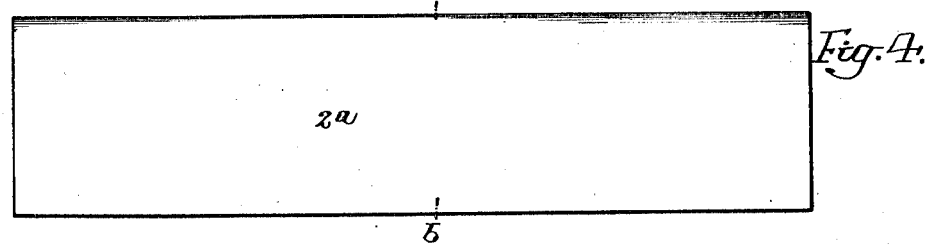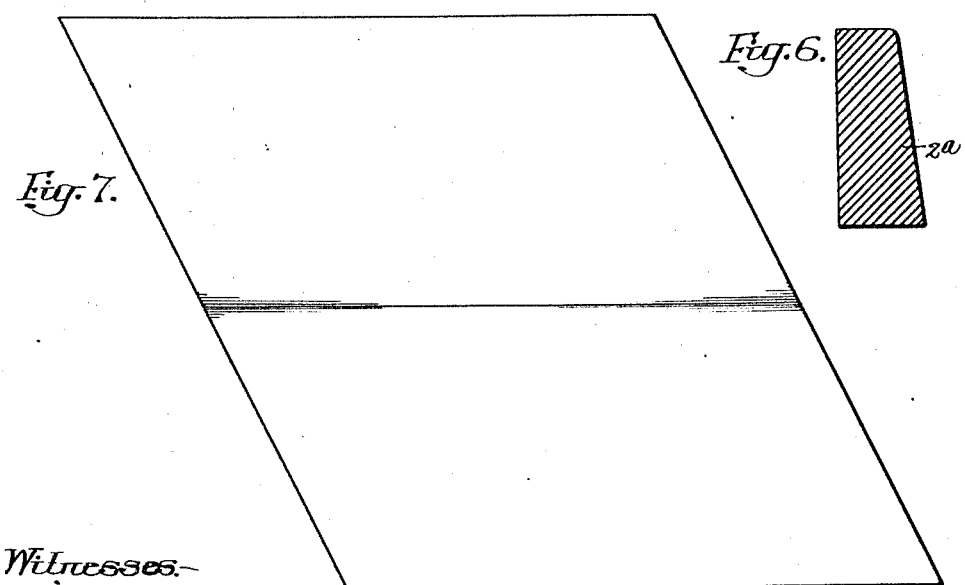

H. T. HALLOWELL.
PROCESS OF MAKING SHAFT COUPLING SLEEVES.
APPLICATION FILED JUNE 5, 1909.
1,107,607.
Patented Aug. 18, 1914.
3 SHEETS—SHEET 3.
Fig. 8.
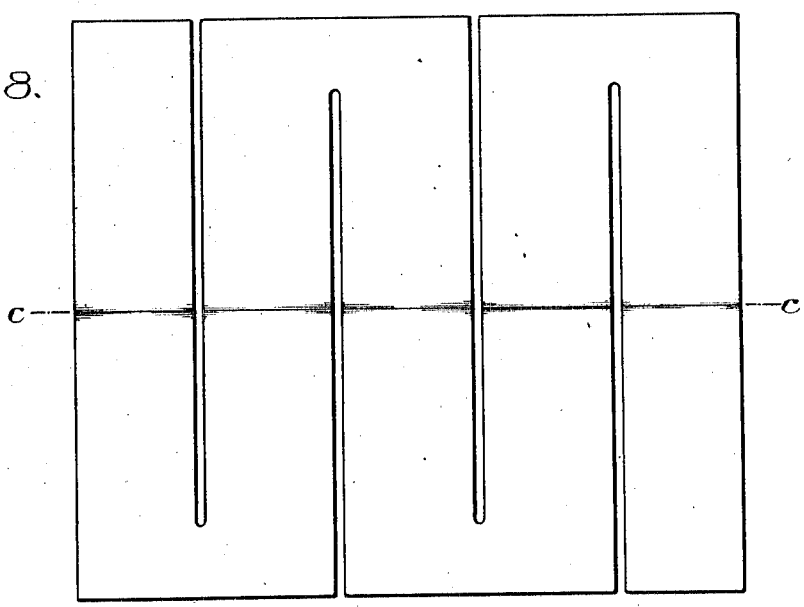
Fig. 9.
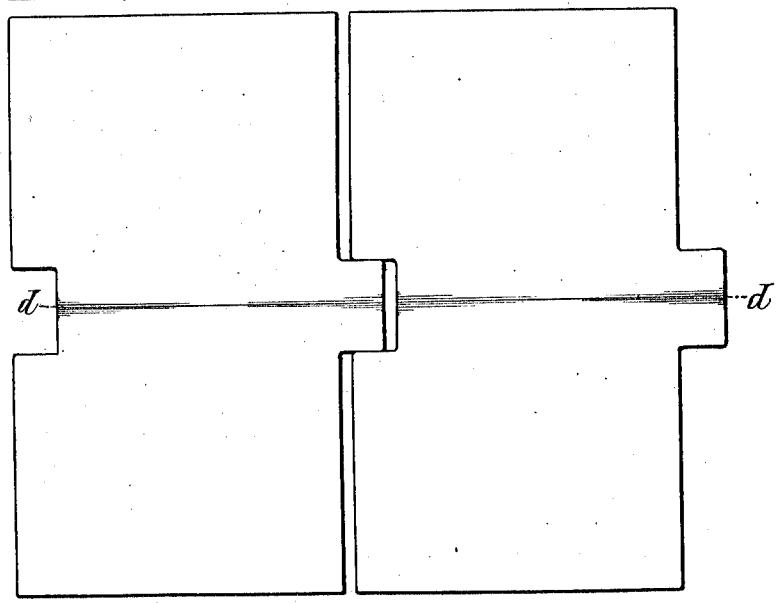
Fig. 11.
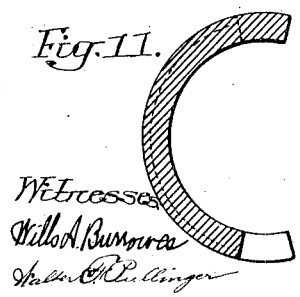
Fig. 10.
Inventor—
Howard T. Hallowell.
by his Attorneys
Howson & Howson

UNITED STATES PATENT OFFICE.

HOWARD T. HALLOWELL, OF PHILADELPHIA, PENNSYLVANIA.

PROCESS OF MAKING SHAFT-COUPLING SLEEVES.

1,107,607.  Specification of Letters Patent.  Patented Aug. 18, 1914.

Application filed June 5, 1909. Serial No. 500,299.

*To all whom it may concern:*

Be it known that I, HOWARD T. HALLOWELL, a citizen of the United States, residing in Philadelphia, Pennsylvania, have invented certain Improvements in Processes of Making Shaft-Coupling Sleeves, of which the following is a specification.

My invention relates to shaft couplings; and the object of my invention is to provide improved connecting means for the meeting ends of shafts which shall be cheap and of such a character as to be capable of being finished at one operation.

My invention consists further of the process of making my improved connecting means.

The structure forming the subject of my invention comprises a sleeve for use with shaft couplings made from rolled sheet metal, preferably cold rolled steel, which is cut into suitably shaped blanks and then bent by the use of proper dies or tools to the finished form ready to fit the shaft or shafts, such sleeve having a tapered wall or walls for engagement by the coupling shell or shells.

Other features of my invention will be fully pointed out hereinafter, reference being had to the accompanying drawings, in which:

Figure 1, is a view of one form of shaft coupling showing connecting means for the shaft ends comprising a sleeve embodying my invention; Fig. 2, is a similar view of another form of coupling showing another form of connecting means for the shaft ends embodying my invention; Fig. 3, is a view of a blank from which the connecting means shown in Fig. 1, may be made; Fig. 4, is a similar view of a blank from which the connecting means shown in Fig. 2, may be made; Figs. 5 and 6, are sectional views on the lines $a$—$a$ and $b$—$b$, Figs. 3 and 4; Figs. 7, 8 and 9, are views of other forms of blanks for the formation of shaft end connecting means embodying my invention, and Figs. 10 and 11, are sectional views on the lines $c$—$c$ and $d$—$d$, Figs. 8 and 9.

By making a bushing or sleeve from sheet metal, preferably cold rolled steel, I am able to eliminate all machine work and produce a finished sleeve or bushing directly from the blank. Moreover, sleeves or connecting means made from steel will stand torsional strains without fracture, and are of especial value under imperfect conditions such, for instance, as poor alinement of the meeting ends of the shafts to be joined.

In Fig. 1, of the drawings, 1, 1, represent the coupling sections of an ordinary form of shaft coupling, and 2 is a sleeve embraced by said coupling sections and receiving the meeting ends of shafts 3. The outer wall of the sleeve 2 tapers from a substantially central median line to the ends, and in addition has a slot extending from end to end of the same providing for the necessary take-up by the cups of the coupling members to cause said sleeve to properly grip said shaft ends.

In Fig. 2, I have shown another form of coupling and shaft connecting means, in which holding is effected by forcing split wedge-shaped collars $2^a$ between the respective shaft ends and the inner wall of a solid sleeve or coupling member $1^a$.

In Figs. 3 and 4, I have shown blanks from which the sleeves or bushings shown in Figs. 1 and 2, may be made; sectional views of such blanks being shown in Figs. 5 and 6. As may be noted, the blanks have walls or webs gradually increasing in thickness as clearly indicated in the drawing, providing the desired taper to the outer surface of the sleeves or bushings when the latter are brought to cylindrical form. The finished sleeve or bushing is left with a slot providing for take-up. In some instances it may be desirable to provide a diagonal slot, and for this purpose the blanks may be cut in the form of rhombs, as shown in Fig. 7, from metal of the same cross-sectional character as that from which the blank shown in Fig. 3 is cut.

In Figs. 8 and 9, I show certain modified forms of blanks within the scope of my invention; that shown in Fig. 9 being made in a plurality of sections, preferably, however, not more than two. These sections are provided with interlocking means at their central median line. The blank shown in Fig. 8 is provided with a plurality of slots increasing the flexibility of the sleeve or bushing made therefrom and insuring a greater amount of compression and therefore greater take-up by the cups of the coupling members.

The structure shown in Figs. 2 and 4, differs from that shown in Figs. 1 and 3, in that a pair of sleeves or bushings are employed, held together by bolts 10 and being wedged by such means between the surface of the meeting ends of the shafts and an outer sleeve or coupling member 1ª having a tapering inner wall.

The steel is first rolled into strips of the desired cross section with a surface finish that is maintained. The blanks are then cut from such strips and formed into sleeves or cylindrical members by suitable means, dies for instance, and without further work they are ready for use. In the instance of the structure shown in Fig. 2, the independent sleeves or bushings are bored to receive the bolts 10.

Other forms of sleeves or bushings may be made within the scope of my invention as set forth in the appended claims; the essential feature being to provide a blank of rolled metal, cold rolled steel being preferred, having a contour that will provide the desired taper for engagement by the walls of the coupling shells after such blank has been rolled into cylindrical form.

I claim:

The process of making split sleeves or bushings for shaft couplings, which comprises rolling a strip or bar of metal having one portion thicker than another with one plane surface and a surface sloping from a central median line whereby the central portion of the strip or bar is thicker than the edges thereof with inclined or sloping plane surfaces between the portions of different thicknesses, simultaneously finishing both surfaces of said strip or bar in the rolling operation, cutting said strip or bar into blanks, and then curving such blanks to form tubular members internally cylindrical with walls parallel to the longitudinal axis of the same.

In testimony whereof, I have signed my name to this specification, in the presence of two subscribing witnesses.

HOWARD T. HALLOWELL.

Witnesses:
 WM. E. SHUPE,
 WM. A. BARR.